(12) United States Patent
Sánchez et al.

(10) Patent No.: US 6,691,834 B2
(45) Date of Patent: Feb. 17, 2004

(54) ELEVATOR GOVERNOR

(75) Inventors: Luis Martí Sánchez, Madrid (ES); Fernando Del Rio Sanz, Madrid (ES); Fernando Santos Cosgaya, Mostoles (ES)

(73) Assignee: Otis Elevator Company, Farmington, CT (US)

( * ) Notice: Subject to any disclaimer, the term of this patent is extended or adjusted under 35 U.S.C. 154(b) by 81 days.

(21) Appl. No.: 09/948,013

(22) Filed: Sep. 6, 2001

(65) Prior Publication Data

US 2003/0042079 A1 Mar. 6, 2003

(51) Int. Cl.⁷ ................................................. B66B 5/04
(52) U.S. Cl. ..................... 187/373; 187/305; 187/350; 188/180; 188/189
(58) Field of Search .................. 187/287, 305, 187/350, 373; 188/180, 188, 189

(56) References Cited

U.S. PATENT DOCUMENTS

| | | | |
|---|---|---|---|
| 610,256 A | * 6/1898 | Brown | 187/350 |
| 753,135 A | * 2/1904 | Hanford | 187/350 X |
| 2,511,697 A | * 6/1950 | Clift | 187/375 |
| 4,856,623 A | 8/1989 | Romig, Jr. | |
| 5,299,661 A | * 4/1994 | Pramanik et al. | 187/373 |
| 5,617,933 A | * 4/1997 | Ericson | 187/350 |

\* cited by examiner

Primary Examiner—Eileen D. Lillis
Assistant Examiner—Thuy V. Tran
(74) Attorney, Agent, or Firm—Carlson, Gaskey & Olds

(57) ABSTRACT

A centrifugally activated device for controlling the speed of movement of an elevator cab includes the capability of controlling upward and downward movement. A first stopping device is associated with at least one elevator sheave. A second stopping device preferably is supported on an opposite side of the same sheave. The second stopping device preferably includes centrifugally activated components such as a latch member that moves from a first position into a second, stopping position responsive to an undesirably high speed of upward movement of the elevator cab. The centrifugally activated components preferably include a latch member that is rotatably supported on the sheave and has an engaging member at one end that engages a cooperating stop surface near the sheave to prevent the sheave from further rotation upon the sheave reaching an undesirably high rate of rotation. In one example, the inventive arrangement also includes a device for preventing both stopping devices from being simultaneously activated.

18 Claims, 3 Drawing Sheets

ELEVATOR GOVERNOR

BACKGROUND OF THE INVENTION

In general terms, this invention relates to elevator speed control. More particularly, this invention relates to a device that is useful for preventing an elevator car from moving beyond a desirable speed.

Elevator control systems typically include a variety of components or devices for controlling movement of the elevator cab within a hoistway. One such device is known as a governor and is often associated with the motor that drives the elevator system components or with at least one of the sheaves that rotates as the elevator cab moves between landings within a building, for example. Typical governors are intended to stop the elevator cab from moving beyond a desired speed in a downward direction.

Centrifugally activated elevator governors that are associated with sheaves are known. One example includes a set of arcuate plates that move from a retracted position into an extended position where they provide a braking capability responsive to the rotary movement of the sheave beyond a desired speed as the elevator cab moves downward. While such centrifugally activated governor devices have been successfully employed for preventing downward movement of an elevator cab, there has not been a corresponding type of governor that is useful for stopping undesirable upward movement of an elevator cab.

While various devices have been proposed or utilized for controlling undesirable upward movement of an elevator cab, they introduce additional complexity and expense into elevator systems. There is a need for a compact, robust device that is readily accommodated within an elevator system to control elevator cab movement in both directions. An assembly designed according to this invention provides that capability and avoids the shortcomings and drawbacks of prior arrangements.

SUMMARY OF THE INVENTION

In general terms, this invention is a device for controlling the movement of an elevator cab. A device designed according to this invention includes a sheave that rotates as the elevator cab moves. A first stopping device associated with the sheave automatically stops the sheave from rotating in a first direction responsive to the sheave rotating in that first direction at a rate that exceeds a chosen rotation speed. A second stopping device is supported on an opposite side of the sheave and automatically stops the sheave from rotating in a second direction. The second stopping device is operative to prevent the sheave from rotating beyond a desired rotation speed in the second direction. A device designed according to this invention, therefore, provides centrifugally activated control of elevator cab movement in two directions with each stopping device associated with the same sheave.

In the preferred arrangement, the second stopping device is useful for stopping the elevator from moving in an upward direction beyond a desired speed. The second stopping device preferably includes a latch member that is moveably supported on the sheave to move between a first position where the sheave is free to rotate and a second position where the stopping device prevents the sheave from rotating and, therefore, prevents the cab from moving in the upward direction.

In one example, the latch member supports a wedge portion at the end that engages a cooperating stop surface on a support near the sheave. When the wedge portion and stop surface are engaged, the sheave cannot rotate and the cab is not capable of moving further in an upward direction.

Another feature of the inventive arrangement is to provide an optional control member to prevent both stopping devices from operating simultaneously.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
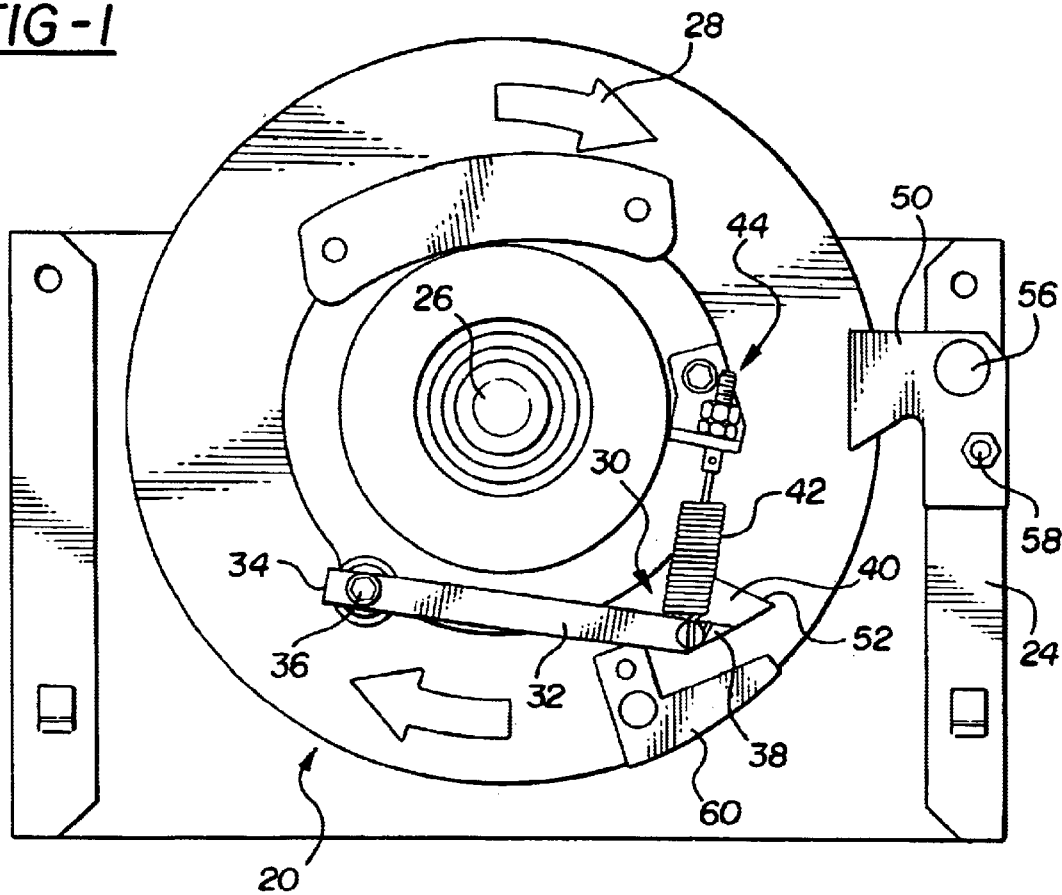
FIG. 1 illustrates an assembly for controlling elevator movement designed according to an embodiment of this invention.

An assembly 20 for controlling movement of an elevator cab within an elevator system has the capability of preventing undesirable high speed movement of the elevator cab in two directions (i.e., upward and downward within a hoistway, for example). An elevator sheave 22 is supported by a mounting member 24 to rotate about an axis 26 as an elevator cab (not illustrated) moves between landings in a building, for example. In the illustrated example as the elevator cab moves downward, the sheave 22 rotates in a clockwise direction as indicated by the arrows 28.

The mounting member 24 can be positioned in a machine room, on a cab or in another position within a hoistway. The sheave 22 preferably rotates with movement of roping or a belt in the elevator system. One advantage of this invention is that it provides an overspeed protection device that is suitable for use on a variety of sheaves in an elevator system. The assembly 20 may be supported on a driving sheave, a passive sheave or separately roped from the elevator drive components.

The preferred embodiment includes a conventional centrifugally activated governor arrangement for controlling undesirably high speed movement of the elevator cab in a downward direction. Conventional governor arrangements that are centrifugally activated and include a set of arcuate plates that move in an outward direction to provide a braking force are known. The assembly 20 preferably includes such an arrangement (partially illustrated in FIGS. 5 and 6, for example). The conventional governor arrangement for controlling undesirably high speed downward movement of the elevator cab is referred to in this description as a first stopping device associated with the sheave 22.

A second stopping device 30 preferably is supported on the sheave 22. In the illustrated example, the first stopping device is supported on one side of the sheave and the second stopping device 30 is supported on an opposite side of the sheave 22. The illustrated second stopping device 30 includes a latch member 32 which includes a lever, having one end 34 that is rotatably supported on the sheave 22 to rotate about an axis 36. An opposite end 38 of the latch member 32 preferably supports a wedge 40. The latch member 32 prevents the elevator cab from moving in an upward direction at an undesirably high speed as described below.

The latch member 32 preferably is biased into a first position by a biasing member 42, which in the illustrated example includes a spring. Another possible biasing member includes a magnet that tends to hold the latch member in the first position. The preferred arrangement includes an adjustment mechanism 44 that permits the bias provided by the biasing member 42 to be selectively adjusted, which allows fine tuning or control of the activation of the second stopping device 30.

Under normal operating conditions, the latch member 32 is biased into a first position where the second stopping device 30 is not active. This position is shown, for example, in FIGS. 1 and 2. In this first position, the wedge 40 does not make contact with a stop member 50 that is supported near the sheave 22.

Figure 2:
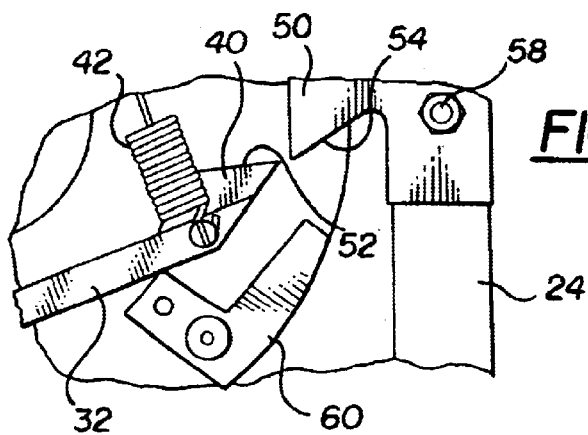
FIG. 2 shows selected components of the embodiment of FIG. 1 in a first operating position.
Figure 3:
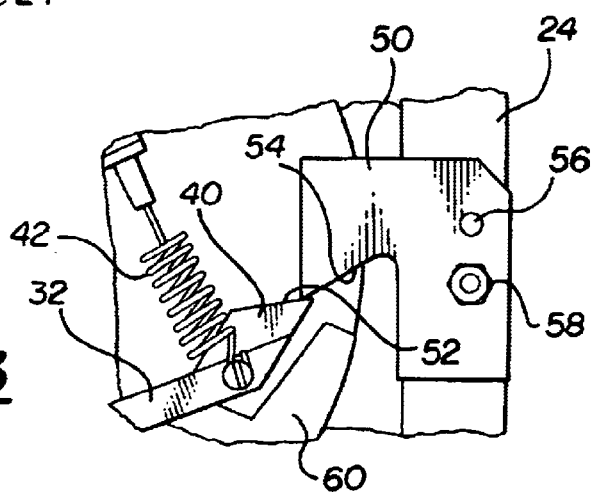
FIG. 3 shows the components of FIG. 2 in a second operating position.
Figure 4:
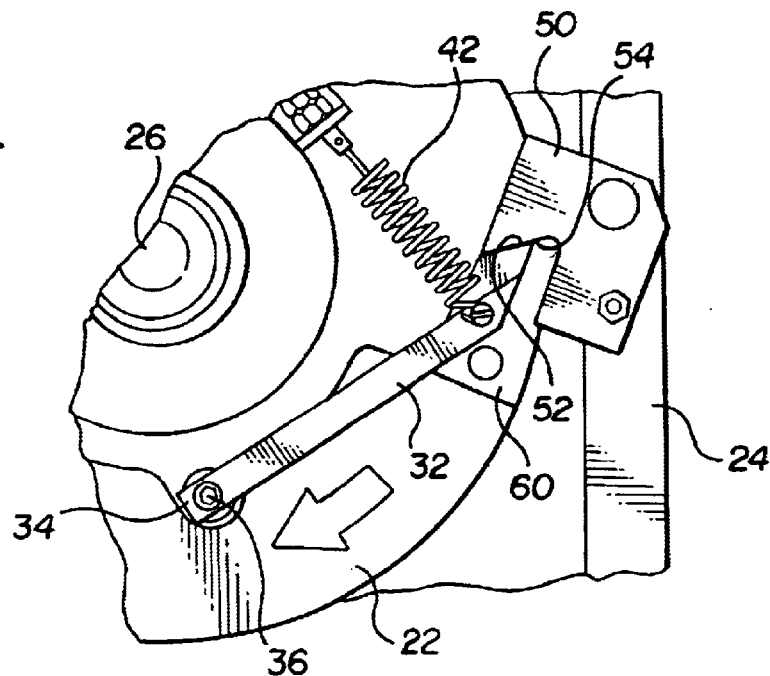
FIG. 4 shows the components of FIGS. 2 and 3 in a third operating position.

When the sheave 22 rotates in a counterclockwise direction (according to the drawings) at an undesirable speed, which corresponds to an undesirably high speed of upward movement of the elevator cab, the stopping device 32 is centrifugally activated. As shown by the progression of FIGS. 2, 3 and 4, the latch member 30 rotates in a radially outward direction about the axis 36 when the rotary speed of the sheave 22 is sufficient to overcome the bias of the biasing member 42. Those skilled in the art who have the benefit of this description will be able to determine how to select the bias of the biasing member 42 to permit activating the second stopping device 30 at an appropriate speed of cab movement.

As the sheave 22 rotates and the latch member 32 progressively moves radially outward, the wedge 40 has a surface 52 that comes in contact with a stop surface 54 on the stop member 50. As the wedge 40 engages the stop member 50, further counter-clockwise rotation (according to the drawings) of the sheave 22 is prevented. Preferably, the wedge 40 becomes nestingly received between the stop surface 54 and a support member 60, which preferably is rigidly supported on the sheave 22. Some form of support member is preferred to provide a more stable arrangement. The illustrated example includes the support member 60 that is a mechanical brace supported on the sheave. Other configurations fit within the scope of this invention.

The final stopping position of the currently preferred arrangement is shown in FIG. 4. In this position, the second stopping device 30 has prevented the sheave 22 from any further counterclockwise movement until the sheave is rotated clockwise far enough for the bias provided by the biasing member 42 to move the latch member 32 back into the first position.

Accordingly, the illustrated arrangement provides a speed governor that prevents the sheave 22 from rotating when the cab is moving at an undesirably high speed in an upward direction. The first stopping device (which can be conventional) operates to prevent undesirable movement of the cab at an undesirably high speed in a downward direction. Accordingly, the assembly 20 provides centrifugally activated speed control in both directions using devices associated with a single sheave.

Figure 5:
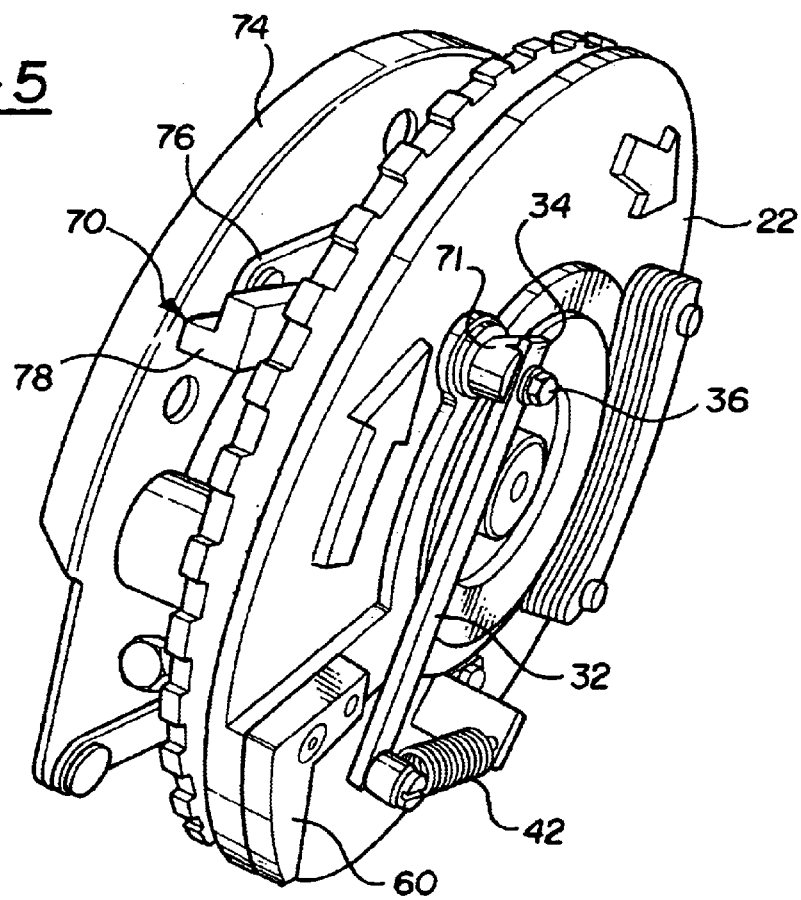
FIG. 5 illustrates another feature of an embodiment of this invention in a first operating position.
Figure 6:
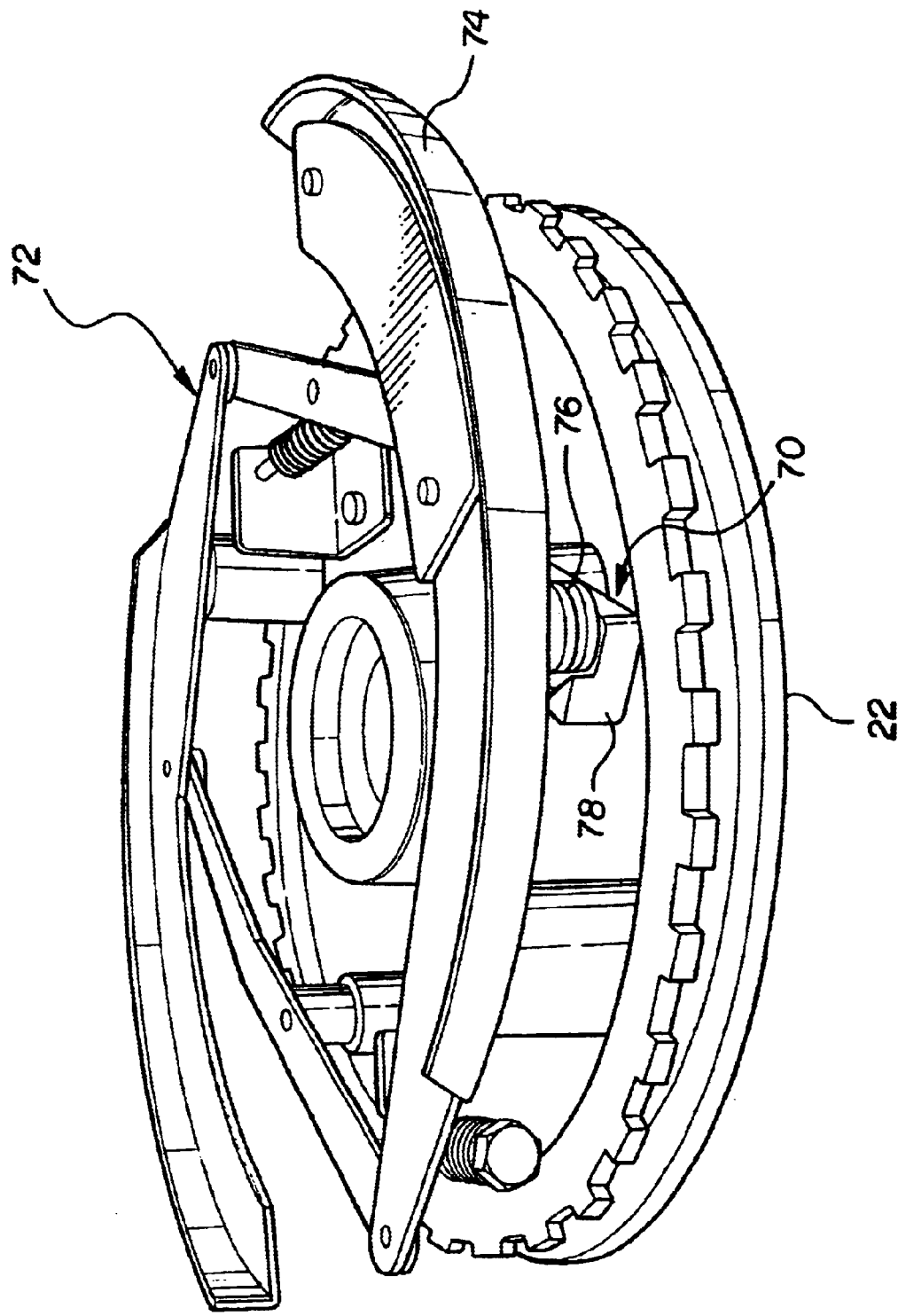
FIG. 6 illustrates the feature of FIG. 5 in a second operating position.

Another feature of a device designed according to this invention includes a control member 70 that prevents simultaneous operation of both speed limiting devices. Preventing simultaneous operation is desired so that movement of the sheave to disengage a stopping device is possible. If both devices were activated, the sheave 22 would not be moveable in either direction and disengagement might not be possible without disassembling at least a portion of the assembly 20. The illustrated example of FIGS. 5 and 6 shows a control member 70 that is coupled with the latch member 32 such that the control member 70 moves with rotation of the latch member 32 about the axis 36. A shaft 71 extends through the sheave 22. The shaft 71 rotates with movement of the latch member 32. The control member 70 is coupled to the shaft 71 to move as the shaft 71 rotates.

The first stopping device 72, which in the illustrated example is responsible for controlling undesirable high speed downward movement of the elevator cab, includes at least one arcuate plate portion 74 that is centrifugally activated as known. An arm 76 associated with the plate portion 74 moves with the plate portion 74 as it moves outward relative to the sheave 22 to provide a braking force. The control member 70 preferably includes a clip portion 78 that engages at least a portion of the arm 76 and prevents radially outward movement of that arm. The control member 70 preferably moves into a position where the clip portion 78 will engage the arm 76 and prevent radially outward movement of that arm into a position where the first stopping device 72 would be activated. The engagement between the clip portion 78 and the arm 76 preferably is timed to coincide with the engagement between the wedge 40 and the stop member 50. By preventing simultaneous activation of both stopping devices, the inventive arrangement prevents a situation where the sheave 22 becomes locked into a position and cannot be readily reset for rotation.

The preceding description is exemplary rather than limiting in nature. Variations and modifications to the disclosed example may become apparent to those skilled in the art that do not necessarily depart from the essence of this invention. The scope of legal protection given to this invention can only be determined by studying the following claims.

We claim:

1. An assembly for controlling movement of an elevator cab, comprising:

a sheave that rotates as the elevator cab moves;

a first stopping device associated with the sheave that automatically stops the sheave from rotating in a first direction responsive to the sheave rotating in the first direction at a rate that exceeds a first desired rotation speed;

a second stopping device supported on the sheave that automatically stops the sheave from rotating in a second direction responsive to the sheave rotating in the second direction at a rate that exceeds a second desired rotation speed; and a control member that prevents the first stopping device from operating to stop the sheave from rotating in the first direction when the second stopping device stops the sheave from rotating in the second direction.

2. The assembly of claim 1, wherein the first stopping device includes at least one moving member that moves from a first position into a second position where the moving member prevents the sheave from rotating in the first direction and the control member is supported on the sheave such that the control member engages and prevents movement of the moving member when the second stopping device stops the sheave from rotating in the second direction.

3. The assembly of claim 2, wherein the control member includes a clip portion that engages a portion of the first stopping device moving member.

4. The assembly of claim 1, wherein the second stopping device includes a latch member that moves into a stop position to stop rotation of the sheave in the second direction and wherein the control member is coupled with the latch member such that the control member moves into a position to prevent the first stopping device from operating responsive to the latch member moving into the stop position.

5. The assembly of claim 4, including a shaft that rotates with movement of the latch member and the control member is coupled with the shaft to move responsive to rotation of the shaft.

6. The assembly of claim 4, wherein the first stopping device includes an arm portion that moves outwardly relative to a center of the sheave as the first stopping device moves into a position to stop rotation of the sheave in the first direction and wherein the control member includes a clip portion that abuts the arm portion and prevents further outward movement of the arm portion.

7. An assembly for controlling movement of an elevator cab, comprising:
   a sheave that rotates as the elevator cab moves;
   a first stopping device supported on a first side of the sheave that automatically stops the sheave from rotating in a first direction responsive to the sheave rotating in the first direction at a rate that exceeds a first desired rotation speed;
   a second stopping device supported on a second side of the sheave that automatically stops the sheave from rotating in a second direction responsive to the sheave rotating in the second direction at a rate that exceeds a second desired rotation speed; and
   wherein the second stopping device includes a latch member that is movably supported on the sheave to move from a first position to a second stop position responsive to the sheave rotating in the second direction beyond the second desired rotation speed.

8. The assembly of claim 7, including a biasing member that biases the latch member into the first position.

9. The assembly of claim 8, wherein the latch member includes a lever that has one end rotatably supported on the sheave such that the lever moves in a direction opposite the bias of the biasing member responsive to the sheave rotating in the second direction beyond the second desired speed.

10. The assembly of claim 9, including a stop member supported near the sheave such that the latch member cooperates with the stop member to stop the sheave from rotating when the latch member moves into the second stop position.

11. The assembly of claim 10, including a wedge portion supported near a second end of the lever that engages the stop member when the latch member is in the second stop position.

12. The assembly of claim 7, including a stop surface supported near the sheave and wherein the latch member includes a lever rotatably supported on the sheave to rotate from a first position into a second stop position where a portion of the lever engages the stop surface to prevent the sheave from rotating.

13. The assembly of claim 12, including a spring that biases the lever into the first position and wherein the bias of the spring is overcome when the sheave rotates in the second direction beyond the second desired speed.

14. The assembly of claim 7, including a support member supported on the sheave that prevents the latch member from moving beyond the second position.

15. The assembly of claim 7, including a control member associated with the latch member that prevents the first stopping device from being activated when the latch member moves into the second position.

16. An assembly for controlling movement of an elevator car, comprising:
   a sheave that rotates as the elevator car moves;
   a first stopping device supported on a first side of the sheave such that the first stopping device rotates with the sheave, the first stopping device automatically stops the sheave from rotating in a first direction responsive to the sheave rotating in the first direction at a rate that exceeds a first desired rotation speed; and
   a second stopping device supported on a second opposite side of the sheave such that the second stopping device rotates with the sheave, the second stopping device having a member that moves relative to the sheave to automatically stop the sheave from rotating in a second direction responsive to the sheave rotating in the second direction at a rate that exceeds the second desired rotation speed.

17. The assembly of claim 16, including a control member associated with the first stopping device that prevents the first stopping device from being activated when the member of the second stopping device has stopped the sheave from rotating in the second direction.

18. The assembly of claim 16, wherein the second stopping device member includes a latch member that is moveably supported on the sheave to move from a first position to a second, stop position responsive to the sheave rotating in the second direction beyond the second desired rotation speed.

* * * * *

UNITED STATES PATENT AND TRADEMARK OFFICE
CERTIFICATE OF CORRECTION

PATENT NO. : 6,691,834 B2
DATED : February 17, 2004
INVENTOR(S) : Sanchez et al.

It is certified that error appears in the above-identified patent and that said Letters Patent is hereby corrected as shown below:

Title Page,
Item [*], Notice, should read as follows:
-- (*) Notice: Subject to any disclaimer, the term of this patent is extended or adjusted under 35 U.S.C. 154(b) by 139 days. --

Signed and Sealed this

Eighth Day of June, 2004

JON W. DUDAS
*Acting Director of the United States Patent and Trademark Office*